(12) United States Patent
Park

(10) Patent No.: US 10,459,854 B2
(45) Date of Patent: Oct. 29, 2019

(54) STORAGE DEVICE INCLUDING A SNOOPER THAT MONITORS A SYSTEM BUS TO DETECT COMPLETION OF WRITING DATA TO A BUFFER MEMORY AND A METHOD THEREOF

(71) Applicant: Samsung Electronics Co., Ltd., Suwon-si, Gyeonggi-do (KR)

(72) Inventor: JunBum Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/840,374

(22) Filed: Dec. 13, 2017

(65) Prior Publication Data

US 2018/0260343 A1    Sep. 13, 2018

(30) Foreign Application Priority Data

Mar. 10, 2017    (KR) ........................ 10-2017-0030763

(51) Int. Cl.
*G06F 13/28*    (2006.01)
*G06F 13/16*    (2006.01)

(52) U.S. Cl.
CPC .......... *G06F 13/1668* (2013.01); *G06F 13/28* (2013.01); *G06F 2213/28* (2013.01)

(58) Field of Classification Search
CPC combination set(s) only.
See application file for complete search history.

(56) References Cited

U.S. PATENT DOCUMENTS

| | | |
|---|---|---|
| 5,551,006 A | 8/1996 | Kulkarni |
| 5,745,732 A | 4/1998 | Cherukuri et al. |
| 6,230,219 B1 | 5/2001 | Fields, Jr. et al. |
| 6,507,920 B1 | 1/2003 | Truebenbach |
| 7,003,628 B1 | 2/2006 | Wiedenman et al. |
| 7,237,071 B2 | 6/2007 | Jahnke |
| 7,395,375 B2 | 7/2008 | Lais et al. |
| 7,620,748 B1 | 11/2009 | Bruce et al. |
| 8,370,541 B2 | 2/2013 | Perozo et al. |
| 8,719,499 B2 | 5/2014 | Auernhammer |
| 2006/0242065 A1* | 10/2006 | Jogand-Coulomb ... G06F 21/10 705/50 |
| 2008/0022413 A1* | 1/2008 | Holtzman ........... G06F 21/6218 726/27 |
| 2008/0307508 A1* | 12/2008 | Conley .................... G06F 21/10 726/4 |
| 2014/0040698 A1 | 2/2014 | Loh et al. |
| 2014/0281164 A1* | 9/2014 | Nishiyama .......... G06F 12/0246 711/103 |
| 2015/0278118 A1* | 10/2015 | Lee ........................ G06F 12/145 711/102 |

(Continued)

*Primary Examiner* — Raymond N Phan
(74) *Attorney, Agent, or Firm* — Harness, Dickey & Pierce, P.L.C.

(57) ABSTRACT

A memory controller according to example embodiments of the inventive concept includes a system bus, a first direct memory access (DMA) engine configured to write data in a buffer memory through the system bus, a snooper configured to output notification information indicating whether the data is stored in the buffer memory by snooping around the system bus, and a second direct memory access (DMA) engine configured to transmit the data written in the buffer memory to a host in response to the notification information from the snooper.

20 Claims, 13 Drawing Sheets

(56) References Cited

U.S. PATENT DOCUMENTS

2016/0103732 A1* 4/2016 Tuers .................. G06F 11/1048
714/764
2018/0129563 A1* 5/2018 Kim .................... G06F 11/1068

* cited by examiner

STORAGE DEVICE INCLUDING A SNOOPER THAT MONITORS A SYSTEM BUS TO DETECT COMPLETION OF WRITING DATA TO A BUFFER MEMORY AND A METHOD THEREOF

CROSS-REFERENCE TO RELATED APPLICATIONS

This U.S. non-provisional patent application claims priority under 35 U.S.C. § 119 of Korean Patent Application No. 10-2017-0030763, filed on Mar. 10, 2017, the entire contents of which are hereby incorporated by reference.

BACKGROUND

The inventive concept relates to semiconductor memories, and more particularly, to a memory controller and a storage device including the same.

A semiconductor memory device is classified into a volatile memory device that loses its stored data when its power is cut off such as a static RAM (SRAM), a dynamic RAM (DRAM), a synchronous DRAM, etc. and a nonvolatile memory device that retains its stored data even when a power supply is cut off such as a read only memory (ROM), a programmable ROM (PROM), an electrically programmable ROM (EPROM), an electrically erasable and programmable ROM (EEPROM), a flash memory device, a phase change RAM (PRAM), a magnetic RAM (MRAM), a resistive RAM (RRAM), a ferroelectric RAM (FRAM), etc.

A flash memory device is widely used as high-capacity storage medium of a computing system. As a computing technology develops, highly improved performance is required for a flash-based high capacity storage medium. To improve performance of the flash-based high capacity storage medium, various techniques or various devices are being developed.

SUMMARY

Example embodiments of the inventive concept provide a memory controller. The memory controller may include a system bus, a first direct memory access (DMA) engine configured to write data in a buffer memory through the system bus, a snooper configured to output notification information indicating whether the data is stored in the buffer memory by snooping around the system bus, and a second direct memory access (DMA) engine configured to transmit the data written in the buffer memory to a host in response to the notification information from the snooper.

Example embodiments of the inventive concept provide a storage device. The storage device may include a nonvolatile memory device, a memory controller configured to transmit data stored in the nonvolatile memory device to a host according to a request of the host, and a buffer memory device configured to temporarily store the data according to a control of the memory controller. The memory controller may include a system bus, a first direct memory access (DMA) engine configured to write the data from the nonvolatile memory device in the buffer memory device through the system bus, a snooper configured to output notification information indicating whether the data is stored in the buffer memory device by snooping around the system bus, and a second direct memory access (DMA) engine configured to transmit the data written in the buffer memory device to the host in response to the notification information from the snooper.

BRIEF DESCRIPTION OF THE FIGURES

Embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
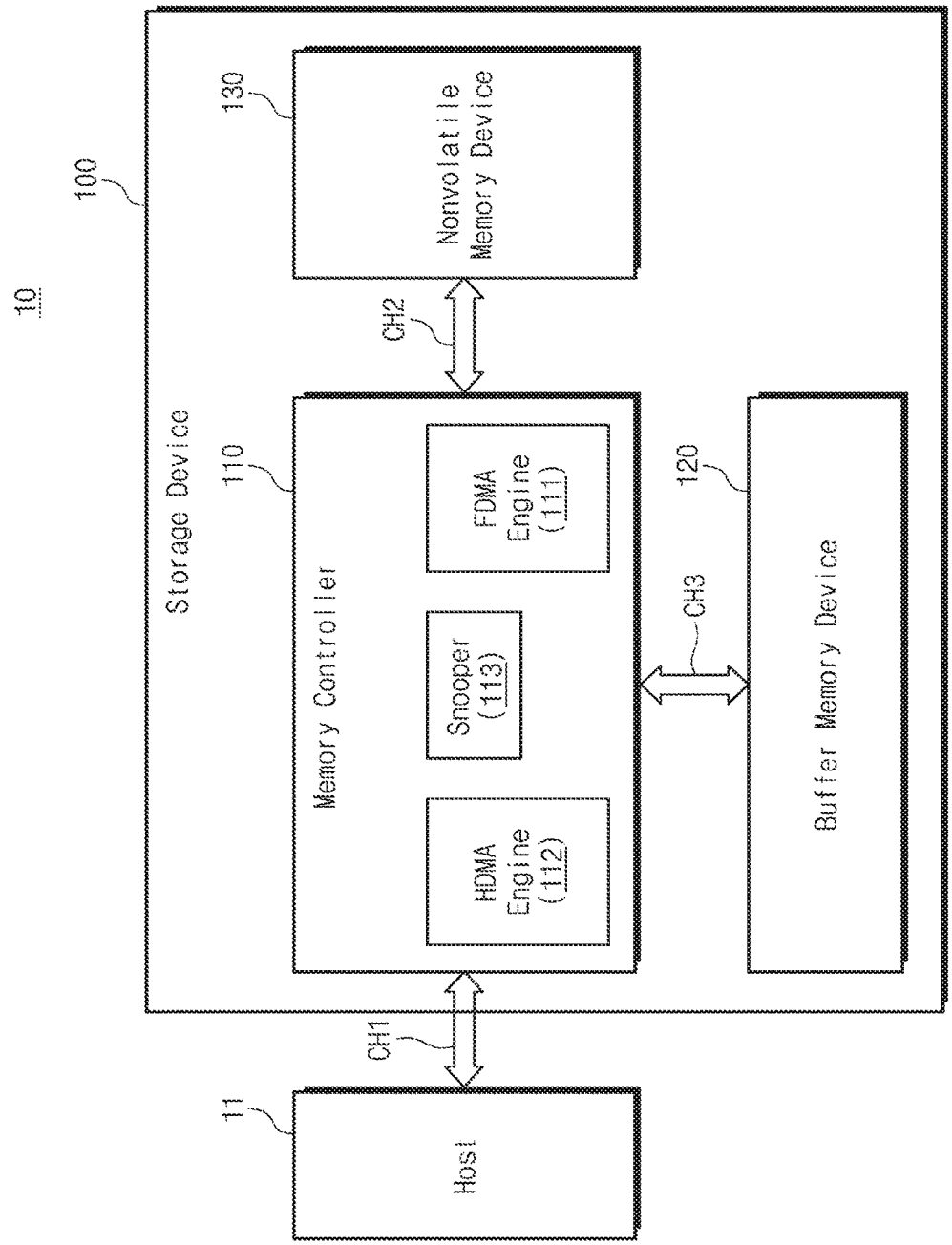
FIG. 1 is a block diagram illustrating a computing system according to example embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

FIG. 1 is a block diagram illustrating a computing system 10 according to example embodiments of the inventive concept. Referring to FIG. 1, the computing system 10 may include a host 11 and a storage device 100. The computing system 10 may include one of a computer, an ultra-mobile PC (UMPC), a workstation, a net-book, a personal digital assistants (PDA), a portable computer, a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, a three dimensional television, a smart television, a digital audio recorder, a digital audio player, a digital picture recorder, a digital picture player, a digital video recorder, a digital video player, a device that can transmit and receive information in a wireless environment, and various electronic devices constituting a home network.

The host 11 may be configured to control an operation of the computing system 10. The host 11 may exchange information and data needed to drive an operating system (OS) or to run a program with the storage device 100.

The storage device 100 may exchange data with the host 11 under the control of the host 11. The storage device 100 may be high-capacity storage medium used in the computing system 10 such as a hard disk, a SSD, a memory card, an embedded memory card, a memory stick, etc.

The storage device 100 may include a memory controller 110, a buffer memory device 120, and a nonvolatile memory device 130. Each of the memory controller 110, the buffer memory device 120, and the nonvolatile memory device 130 may be a separate semiconductor die, chip, package or module. Alternatively, the memory controller 110, the buffer memory device 120, and the nonvolatile memory device 130 may be embodied in one or two semiconductor dies, chips, packages, or modules.

The memory controller 110 may write data in the nonvolatile memory device 130 or transmit data read from the nonvolatile memory device 130 to the host 11 under the control of the host 11. The memory controller 110 may be configured to exchange various data such as a flash translation layer (FTL) program code, or a mapping table. required for operating the nonvolatile memory device 130.

The buffer memory device 120 may be configured to temporarily store write data received from the host 11 or data read from the nonvolatile memory device 130 under the control of the memory controller 110.

A first transmission channel CH1 may be used for data communication between the host 11 and the memory controller 110 and a second transmission channel CH2 may be used for data communication between the memory controller 110 and the nonvolatile memory device 130. The bandwidth and transmission speed of the first transmission channel CH1 may be different from those of the second transmission channel CH2. Solving such a transmission speed difference between the first channel CH1 and the second channel CH2, the buffer memory device 120 may be configured to temporarily store write data or read data.

The buffer memory device 120 may include a high speed random access memory such as a static random access memory (SRAM), a dynamic RAM (DRAM), a synchronous DRAM (SDRAM), etc. Alternatively, the buffer memory device 120 may include a nonvolatile memory such as a ROM (read only memory), a PROM (programmable ROM), an EPROM (electrically programmable ROM), an EEPROM (electrically erasable and programmable ROM), a flash memory, a PRAM (phase change RAM), a MRAM (magnetic RAM), a RRAM (resistive RAM), a FRAM (ferroelectric RAM), a TRAM (thyristor RAM), etc. In example embodiments, the buffer memory device 120 is a dual-port memory and may be configured to be controlled by each of a flash direct memory access (FDMA) engine 111 and a host direct memory access (HDMA) engine 112.

The nonvolatile memory device 130 may be configured to store data or provide the stored data to the memory controller 110 under the control of the memory controller 110. The nonvolatile memory device 130 may include a nonvolatile memory such as a ROM (read only memory), a PROM (programmable ROM), an EPROM (electrically programmable ROM), an EEPROM (electrically erasable and programmable ROM), a flash memory, a PRAM (phase change RAM), a MRAM (magnetic RAM), a RRAM (resistive RAM), a FRAM (ferroelectric RAM), a TRAM (thyristor RAM), etc.

The memory controller 110 according to example embodiments of this inventive concept may include the FDMA engine 111, the HDMA engine 112, and a snooper 113. The FDMA engine 111, the HDMA engine 112, and the snooper 113 may be embodied in the form of hardware, software, or a combination thereof.

The FDMA engine 111 may be configured to control a direct memory access (DMA) operation between the nonvolatile memory device 130 and the buffer memory device 120. The HDMA engine 112 may be configured to control a DMA operation between the buffer memory device 120 and the host 11.

For example, the storage device 100 may operate in a DMA mode to improve a data transmission speed. The DMA mode indicates an operation mode where data is written to or read from the buffer memory device 120 according to a control of the DMA engines 111 and 112 without intervention of a processor or a core included in the memory controller 110. Because any control or process of the processor or the core is not required, data transmission speed may be improved. In this DMA operation, the FDMA engine 111 may control data transmission between the nonvolatile memory device 130 and the buffer memory device 120 and the HDMA engine 112 may control data transmission between the host 11 and the buffer memory device 120.

According to an example embodiment, if the memory controller 110 receives a read request from the host 11, the FDMA engine 111 may be configured to read data (e.g., data corresponding to an address included in the read request) from the nonvolatile memory device 130 and store the read data in the buffer memory device 120 without a control of the processor or the core. After the read data is stored in the buffer memory device 120, the HDMA engine 112 may be configured to read data stored in the buffer memory device 120 and transmit the read data to the host 11 without a control of the processor or the core.

The snooper 113 may detect whether all read data is written into the buffer memory device 120 by the FDMA engine 111 through a snooping operation. The snooper 113 may transmit a detection result to the HDMA engine 112. According to the example embodiments, the snooping operation may be an operation to monitor a specific bus (e.g., a data bus or an address bus) included in the memory controller 110 to obtain data, control information, or address information transmitted from the memory controller 110.

For example, the FDMA engine 111 may write data read from the nonvolatile memory device 130 in the buffer memory device 120 through a system bus located inside the memory controller 110, or a third transmission channel CH3 between the memory controller 110 and the buffer memory device 120. The snooper 113 may be configured to snoop around the system bus located inside the memory controller 110, or the third transmission channel CH3 between the memory controller 110 and the buffer memory device 120.

The snooper 113 may further detect whether meta data with respect to the data from the nonvolatile memory device is written into the buffer memory device 120 through the snooping operation. The meta data indicates additional information such as an error correction code or a valid bit with respect to the written data into the buffer memory device 120. The valid bit may be information which indicates whether the data stored in the buffer memory device 120 is valid. That is, that the valid bit stored in the buffer memory device 120 may indicate that the data from the nonvolatile memory device is successfully written into the buffer memory device 120. Since the meta data may be written into the buffer memory device 120 after the data from the nonvolatile memory device is written into the buffer memory device 120, it may be possible to determine that the data from the nonvolatile memory device is completely written into the buffer memory device 120 by checking presence of the meta data.

According to example embodiments, when a read request is received from the host 11, a part of an area of the buffer memory device 120 may be allocated as a read buffer area for storing read data. The FDMA engine 111 may write the read data and the meta data in the allocated buffer area. If address information (esp., address information of an area in which meta data is to be stored) corresponding to the allocated buffer area is transmitted through the system bus, the meta data would be written in the buffer memory device 120 by the FDMA engine 111. At this time, the snooper 113 may detect whether the read data and the meta data are written in the buffer memory device 120 by snooping the system bus (especially, address bus) to detect whether address information (especially, address information of an area in which meta data is stored) is transmitted through the system bus.

In the case where it is detected through the snooping operation that the FDMA engine 111 writes all the read data, the snooper 113 may be configured to provide a detection result to the HDMA engine 112. The HDMA engine 112 may be configured to read data stored in the buffer memory device 120 and to transmit the read data to the host 11 without a control of a processor or a core in response to the detection result from the snooper 113.

As described above, the storage device 100 may detect that the read data is completely written into the buffer memory by the FDMA engine 111 through the snooping operation and may begin a DMA operation of the HDMA engine 112 based on the detection result. Since delay caused by an operation (e.g., periodical polling operation) of checking data stored in the buffer memory device 120 is reduced, overall performance of the storage device 100 is improved.

For example, a conventional HDMA engine checks a state of read data stored in the buffer memory device through a periodical polling operation on the buffer memory device and begins a transmission operation based on a result of the polling operation. Since the polling operation is periodically performed with a predetermined period, a data transmission by the HDMA engine may not begin right after the read data is written into the buffer memory.

According to example embodiments of the inventive concept, since the snooper 113 detects that the read data (or transmissible data unit) is completely written into the buffer memory device 120 through the snooping operation, a data transmission by the HDMA engine 111 may begin right after the completion of writing data into the buffer memory based on the detection result. The delay due to the periodic polling operation may be prevented.

In example embodiments, the FDMA engine 111, the HDMA engine 112, and the snooper 113 may be embodied by a separate hardware circuit as illustrated in FIG. 1. Alternatively, the FDMA engine 111 and the HDMA engine 112 may be embodied in one hardware circuit and may be distinguished from each other by their functions.

For convenience of description, embodiments of the inventive concept are described based on a read operation of the storage device according to a read request of the host. In the read operation, an operation performed by the FDMA engine 111, that is, an operation of reading data from the nonvolatile memory device 130 and writing the read data in the buffer memory device 120 is called as a "FDMA operation". In the read operation, an operation performed by the HDMA engine 112, that is, an operation of reading data from the buffer memory device 120 and transmitting the read data to the host 11 is called as a "HDMA operation". However, the scope of the inventive concept is not limited thereto and a technical sprit of the inventive concept may be similarly applied to a write operation of the storage device 100.

For convenience of description, in the embodiments of the inventive concept, it is described that the snooper 113 simply snoops the system bus used by the FDMA engine 111. However, the scope of the inventive concept is not limited thereto and the snooping operation by the snooper 113 may indicate an operation of detecting whether address information with respect to the buffer area allocated for a read operation (more specifically, address information of a buffer area in which meta data is to be stored) is transmitted by snooping the system bus.

Figure 2:
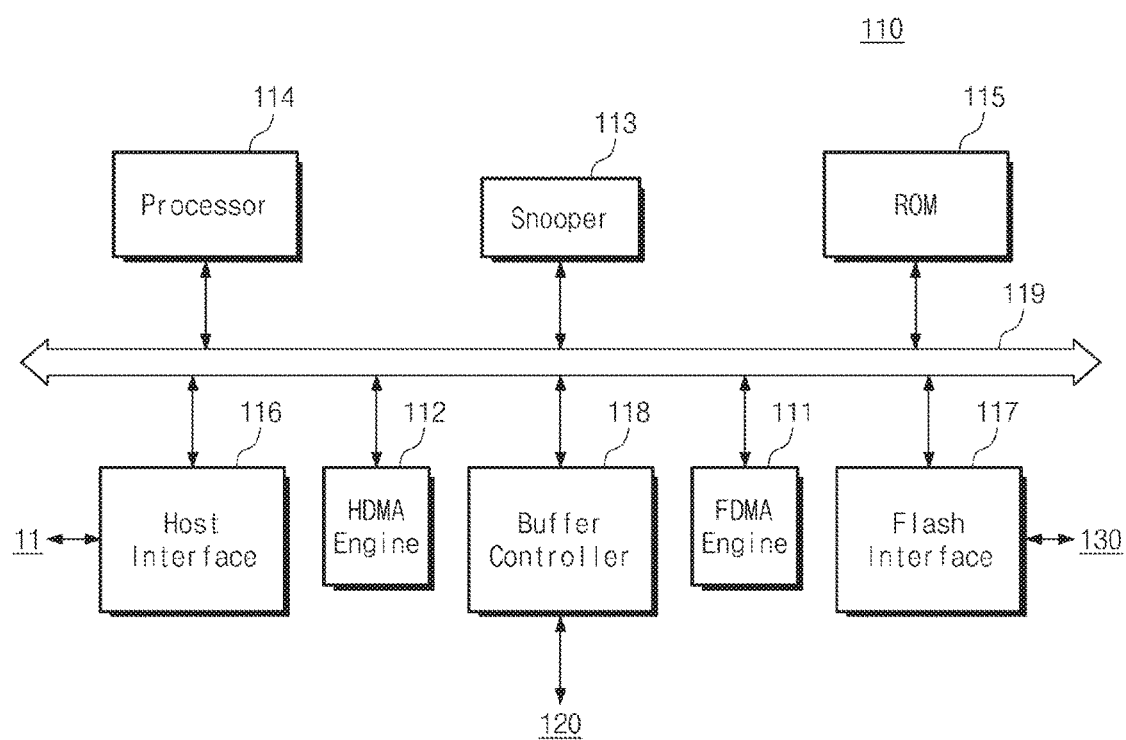
FIG. 2 is a block diagram illustrating a memory controller of FIG. 1 in detail.

FIG. 2 is a block diagram illustrating a memory controller of FIG. 1 in detail. Referring to FIGS. 1 and 2, the memory controller 110 may include the FDMA engine 111, the HDMA engine 112, the snooper 113, a processor 114, a ROM 115, a host interface 116, a flash interface 117, a buffer controller 118, and a system bus 119.

Since the FDMA engine 111, the HDMA engine 112, and the snooper 113 were described with reference to FIG. 1, a detailed description thereof is omitted. The processor 114 may be configured to control an overall operation of the memory controller 110. The processor 114 may be configured to drive various software layers required when the memory controller 110 operates or to control various hardware configurations included in the memory controller 110.

In example, the processor 114 may be configured to perform an initial setting on each of the FDMA engine 111 and the HDMA engine 112 to perform the FDMA operation and the HDMA operation. The FDMA engine 111 and the HDMA engine 112 may be configured to perform the FDMA operation and the HDMA operation respectively according to the initial setting of the processor 114. The initial setting by the processor 114 indicates an operation of inputting or setting a target address, an address size, an input/output (I/O) device, number, input/output information, etc. to or in the FDMA engine 111 and the HDMA engine 112.

For convenience of description, the processor 114 performs an initial setting with respect to the FDMA engine 111 and the HDMA engine 112 in response to a read request from the host 11. However, the scope of the inventive concept is not limited thereto and in a read operation, the processor 114 may initially set the FDMA engine 111 in response to the read request from the host 11. The FDMA engine 111 may read data from the nonvolatile memory device 130 in response to initial setting information. After that, the FDMA engine 111 may be configured to provide setting information to the HDMA engine 112. The HDMA engine 112 may operate according to the information provided by the FDMA engine 111. That is, the FDMA engine 111 and the HDMA engine 112 may be configured to be set at different points in time according to a sequence of operation.

The ROM 115 may store various information required when the memory controller 110 operates in the form of firmware. The firmware stored in the ROM 115 may be driven by the processor 114.

The memory controller 110 may be configured to communicate with the host 11 through the host interface 116. The host interface 116 may include at least one of interfaces such as a universal serial bus (USB), a double data rate (DDR), a multimedia card (MMC), an embedded MMC, a peripheral component interconnection (PCI), a PCI-express, an advanced technology attachment (ATA), a serial-ATA, a parallel-ATA, a small computer small interface (SCSI), an enhanced small disk interface (ESDI), an integrated drive electronics (IDE), a Firewire, a (universal flash storage (UFS), a nonvolatile memory-express (NVMe), etc. The memory controller 110 may be configured to communicate with the nonvolatile memory device 130 through the flash interface 117.

The buffer controller 118 may be configured to control the buffer memory device 120. The buffer controller 118 may generate various control signals for writing data in the buffer memory device 120 or reading data stored in the buffer memory device 120 to provide the generated control signals to the buffer memory device 120. In the FDMA operation or the HDMA operation, the buffer controller 118 may be configured to write data in the buffer memory device 120 or to read data written in the buffer memory device 120 under the control of the FDMA engine 111 and the HDMA engine 112.

The system bus 119 may be configured to provide a transmission path of data, information, or a control signal between configuration elements included in the memory controller 110. The system bus 119 may provide various information transmission paths such as a data bus, an address bus, a control bus, etc.

In example embodiments, the FDMA engine 111 may provide data read from the nonvolatile memory device 130 to the buffer memory device 120 through the system bus 119. That is, the FDMA engine 111 may be configured to perform the FDMA operation through the system bus 119. The HDMA engine 112 may read data from the buffer memory device 120 through the system bus 119. That is, the HDMA engine 112 may be configured to perform the HDMA operation through the system bus 119. However, the scope of the inventive concept is not limited thereto.

The snooper 113 may be configured to snoop around the system bus 119. The snooper 113 may snoop around the system bus 119 to detect whether read data or transmissible data unit is completely written into the buffer memory device 120 by the FDMA engine 111. The snooper 113 may provide a detection result to the HDMA engine 112 and the HDMA engine 112 may perform the HDMA operation in response to the detection result from the snooper 113. However, the scope of the inventive concept is not limited thereto and the snooper 113 may be configured to snoop around the system bus 119 or the third channel CH3 between the buffer controller 118 and the buffer memory device 120.

Although not illustrated in the drawing, the memory controller 110 may further include configuration elements such as an ECC (error correction code) engine, a randomizer, a SRAM, etc.

Figure 3:
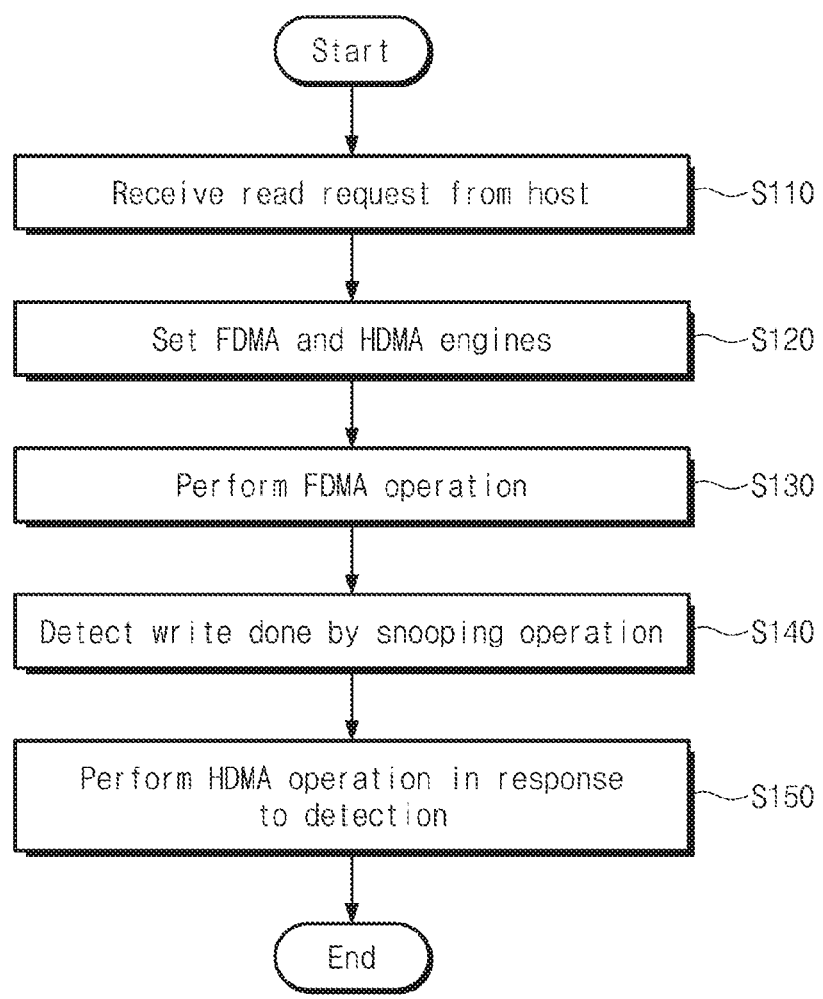
FIG. 3 is a flowchart illustrating an operation of a memory controller of FIG. 2.

FIG. 3 is a flowchart illustrating an operation of a memory controller of FIG. 2. Referring to FIGS. 1 through 3, in an operation S110, the memory controller 110 may receive a read request from the host 11.

In an operation S120, the memory controller 110 may perform an initial setting with respect to the FDMA engine 111 and the HDMA engine 112 in response to the read request. For example, the processor 114 of the memory controller 110 may perform an initial setting with respect to the FDMA engine 111 and the HDMA engine 112 for the FDMA operation and the HDMA operation. Since the initial setting with respect to the FDMA engine 111 and the HDMA engine 112 was described with reference to FIG. 2, a detailed description thereof is omitted.

In an operation S130, the memory controller 110 may perform the FDMA operation. For example, the FDMA engine 111 of the memory controller 110 may perform the FDMA operation based on the initial setting information to write read data from the nonvolatile memory device 130 in the buffer memory device 120.

In an operation S140, the memory controller 110 may detect a write completion through the snooping operation. For example, the snooper 113 of the memory controller 110 may snoop around the system bus 119 to detect whether the read data is written in the buffer memory device 120. In example embodiments, the snooper 113 may snoop around the system bus 119 to detect whether meta data with respect to the read data is written in the buffer memory device 120 by the FDMA engine 111. In an operation S150, the memory controller 110 may perform the HDMA operation in response to the detection. The HDMA engine 112 of the memory controller 110 may begin the HDMA operation in response to a detection result from the snooper 113. The HDMA engine 112 may read data from the buffer memory device 120 and transmit the read data to the host 11, in response to the detection result from the snooper 113.

Figure 4:
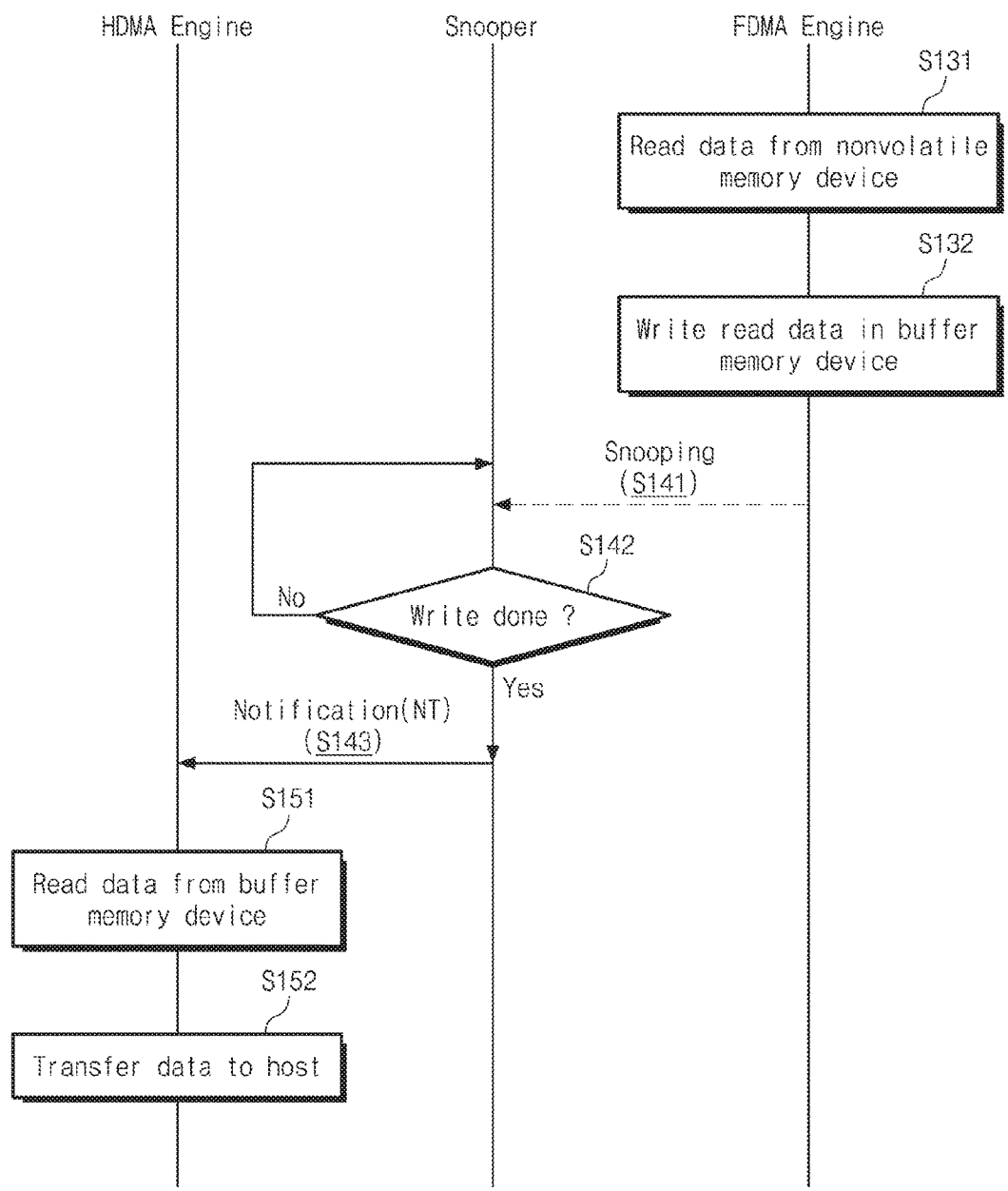
FIG. 4 is a flowchart illustrating an operation of a memory controller of FIG. 3 in detail.

FIG. 4 is a flowchart illustrating an operation of a memory controller of FIG. 3 in detail. An operation of each of the FDMA engine 111, the HDMA engine 112, and the snooper 113 is described with reference to FIG. 4.

Referring to FIGS. 2 through 4, in an operation S131, the FDMA engine 111 may read data from the nonvolatile memory device 130. As described with reference to the operation S120 of FIG. 3, the FDMA engine 111 may be initially set by the processor 114. The FDMA engine 111 may read data (or read data) from the nonvolatile memory device 130 based on the information initially set.

In an operation S132, the FDMA engine 111 may write the read data in the buffer memory device 120. For example, the FDMA engine 111 may write the read data in the buffer memory device 120 using the system bus 119. In example embodiments, after writing the read data in the buffer memory device 120, the FDMA engine 111 may write meta data with respect to the read data in the buffer memory device 120. Alternatively, whenever a part of the read data is written in the buffer memory device 120, the FDMA engine 111 may write corresponding meta data in the buffer memory device 120. In example embodiments, the part of the read data may have a predetermined data unit.

The operations S131 and S132 may be included in the FDMA operation of the operation S130 of FIG. 3.

In an operation S141, the snooper 113 may snoop around the system bus 119. In an operation S142, the snooper 113 may determine whether a write of the read data is completed. As described above, the snooper 113 may snoop around the system bus 119 to detect whether the read data is written in the buffer memory device 120. More specifically, the snooper 113 may determine whether a write of a part of the read data is completed by snooping around the system bus 119 to determine whether the meta data is stored in the buffer memory device 120.

During writing of a part of the read data, the snooper 113 may continuously snoop around the system bus 119. Once the snooper 113 detects that the writing of a part of the read data is completed, the snooper 113 may provide notification information (NT) to the HDMA engine 112. The notification information (NT) may be information (i.e., a detection result) that notifies that read data or a part of the read data is written in the buffer memory device 120. The part of the read data may indicate a data unit by which the HDMA operation is possible. The notification information (NT) may be provided from the snooper 113 to the HDMA engine 112 through the system bus 110 or a separate dedicated line.

The operations S141 through S142 may be included in the write completion detection operation (i.e., the snooping operation) of the operation S140 of FIG. 3.

In an operation S151, the HDMA engine 112 may read data from the buffer memory device 120 in response to the notification information (NT) from the snooper 113. In an operation S152, the HDMA engine 112 may transmit the read data to the host 11. The HDMA engine 112 may transmit the read data to the host 11 through the host interface 116. The operations S151 and S152 may be included in the operation S150 of FIG. 3.

Figure 5:
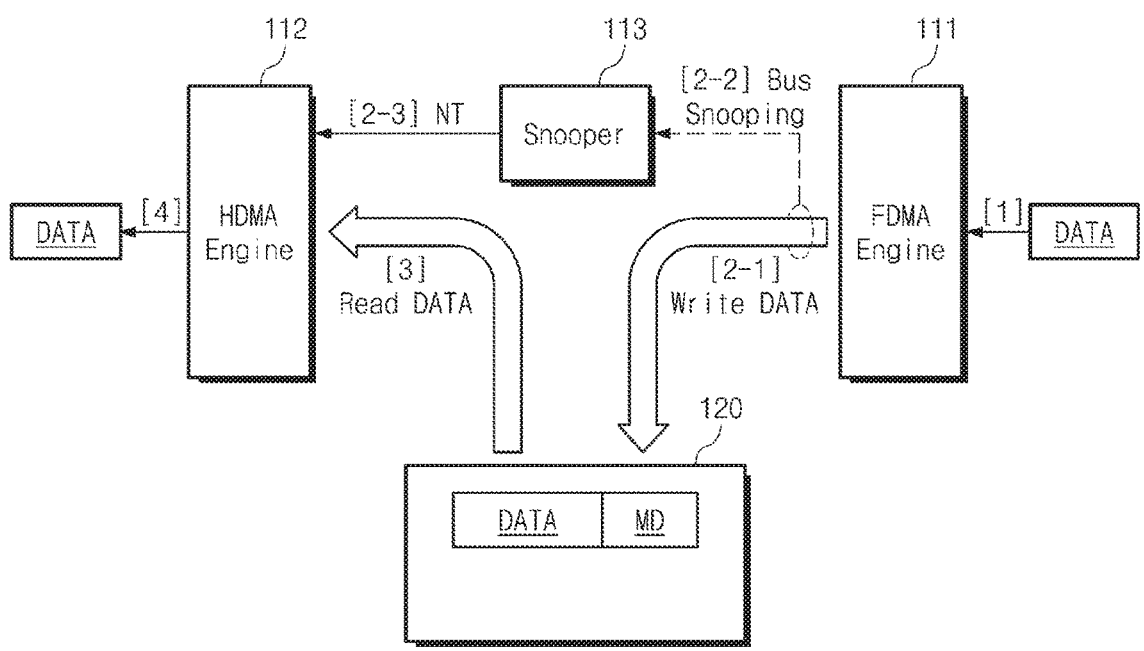
FIG. 5 is a conceptual diagram for explaining an operation illustrated in the flowchart of FIG. 4 in detail.

FIG. 5 is a conceptual diagram for explaining an operation illustrated in the flowchart of FIG. 4 in further detail. For convenience of description, it is assumed that the FDMA engine 111 and the HDMA engine 112 illustrated in FIG. 5 are in a state initially set by the processor 114 and the FDMA engine 111 and the HDMA engine 112 may be performed without intervention of the processor 114.

It is illustrated that the FDMA engine 111 and the HDMA engine 112 may read data DATA for further processing. However, the scope of the inventive concept is not limited thereto and the FDMA engine 111 and the HDMA engine 112 may be configured to control a data flow or a data path in the system bus 119 without intervention of the processor 114.

Referring to FIGS. 1 and 5, the FDMA engine 111 may read data DATA from the nonvolatile memory device 130 (operation [1]). The FDMA engine 111 may write the read data DATA in the buffer memory device 120 (operation [2-1]). After writing the read data DATA in the buffer memory device 120, the FDMA engine 111 may write meta data (MD) which are related with the data DATA in the buffer memory device 120. The meta data (MD) may indicate additional information such as an error correction code, a valid bit, etc. If the meta data (MD) is written in the buffer memory device 120, this may indicate that the data DATA have already been written into the buffer memory device 120. The data DATA and the meta data (MD) may be stored in a buffer area allocated of the buffer memory device 120 and may be in ready state to be read out by a read operation by the HDMA engine.

The snooper 113 may snoop around the system bus 119 during a write operation (i.e., operation [2-1]) by the FDMA engine 111 (operation [2-2]). The snooper 113 may detect whether the meta data (MD) is written into the buffer memory device 120 through the snooping operation. In example embodiments, through the snooping operation, the snooper 113 may detect whether address information of the allocated buffer area or address information of a buffer area in which meta data is to be stored is transmitted through the system bus 119.

In the case where it is detected that the meta data (MD) is written in the buffer memory device 120, the snooper 113 may transmit the notification information (NT) to the HDMA engine 112 (operation [2-3]). The HDMA engine 112 may read the data DATA from the buffer memory device 120 in response to the notification information (NT) (operation [3]). The HDMA engine 112 may transmit the read data DATA to the host 11 (operation [4]).

Although the FDMA operation and the HDMA operation with respect to one unit data were described with respect to FIG. 5, the scope of the inventive concept is not limited thereto. The FDMA engine 111 may perform the FDMA operation described above on a plurality of unit data. The snooper 113 may detect whether each unit data is written through the snooping operation and provide the notification information (NT) to the HDMA engine 112 according to a detection result. The HDMA engine 112 may perform a HDMA operation with respect to each unit data in response to the notification information (NT).

The operations [1], [2-1], [2-2], [2-3], [3], or [4] illustrated in FIG. 5 may be performed in parallel. For example, after writing first read data in the buffer memory device 120, the FDMA engine 111 may write second read data in the buffer memory device 120. The snooper 113 may detect a write completion of the first read data through the snooping operation and may provide the notification information (NT) to the HDMA engine 112. While the second read data is written in the buffer memory device 120, the HDMA engine 112 may read the first read data from the buffer memory device 120 and may transmit the first read data to the host 11.

The memory controller 110 may include the snooper 113 that snoops around the system bus 119. The snooper 113 may snoop around the system bus 119 to detect whether read data is written in the buffer memory device 120 by the FDMA engine 111. The HDMA engine 112 may begin the HDMA operation in response to a detection result (or, notification information) of the snooper 113. Since an operation (e.g., a polling operation of the HDMA engine 112) for checking data within the buffer memory device 120 is not required, a delay due to the operation for checking data may be prevented. Accordingly, overall performance of the storage device may be improved.

Figure 6:
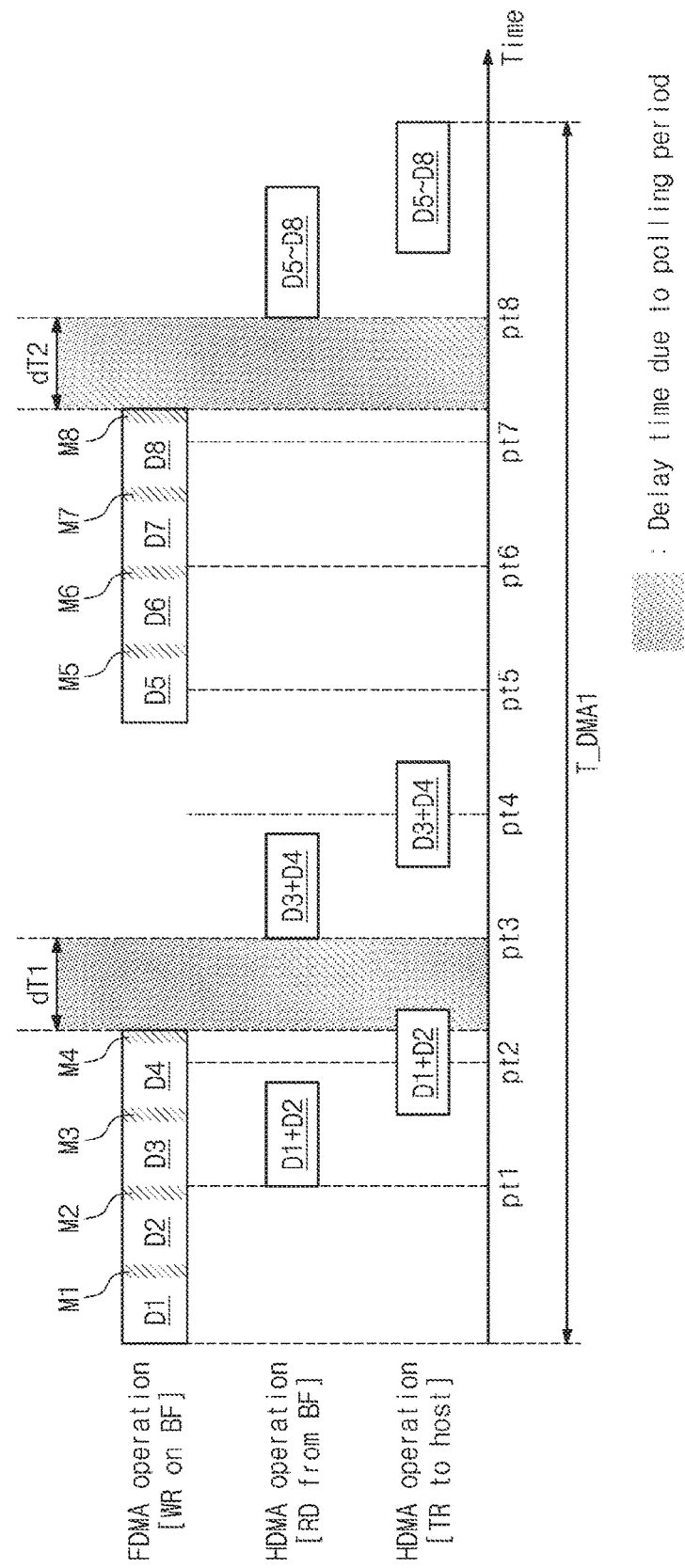
FIG. 6 is a timing diagram illustrating a DMA operation based on a polling operation.
Figure 7:
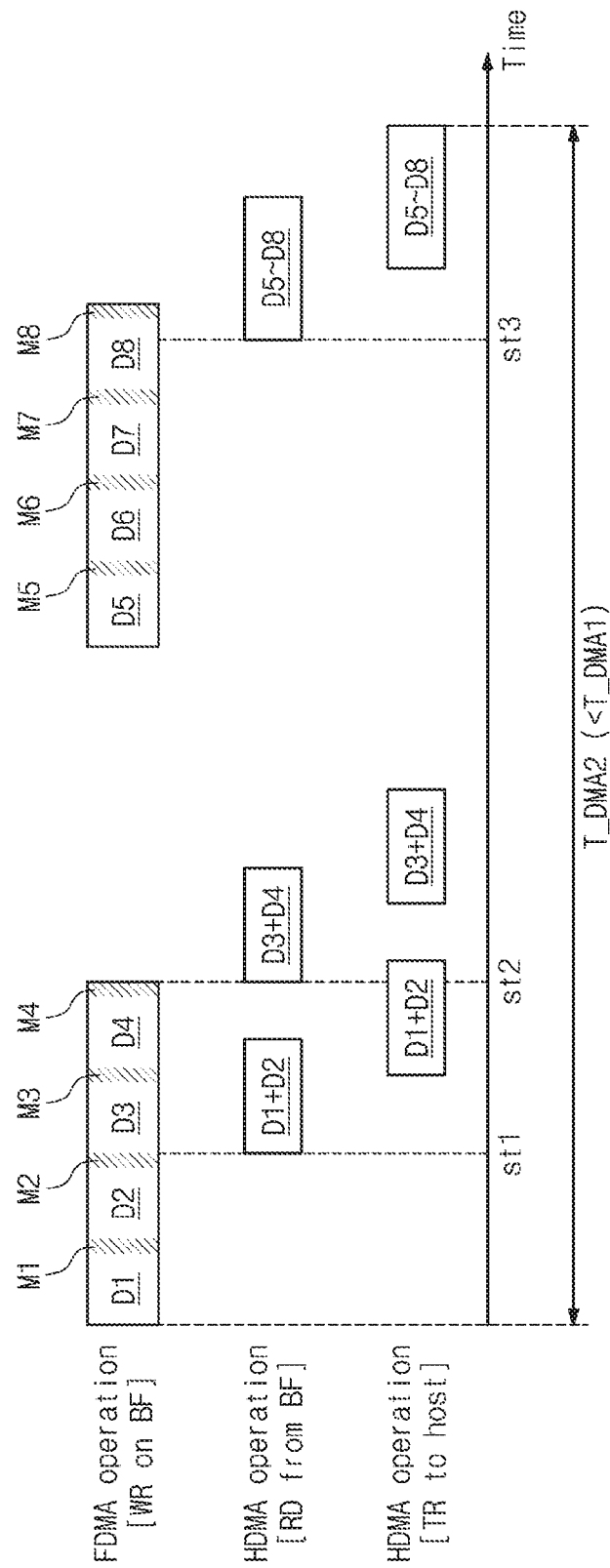
FIG. 7 is a timing diagram illustrating a DMA operation based on a snooping operation according to example embodiments of the inventive concept.

FIG. 6 is a timing diagram illustrating a DMA operation based on a polling operation. FIG. 7 is a timing diagram illustrating a DMA operation based on a snooping operation according to example embodiments of the inventive concept. A horizontal axis of the timing diagrams of FIGS. 6 and 7 indicates time. Referring to FIGS. 6 and 7, performance improvement of a storage device according to example embodiments of the inventive concept is described.

For brevity of drawing and for convenience of description, operations below are described based on a single read operation performed by a single read request from the host 11. It is assumed that the single read operation is a read operation with respect to first to eighth data (D1 to D8). That is, after being initially set by the processor 114, each of the FDMA engine 111 and the HDMA engine 112 may perform the FDMA operation and the HDMA operation with respect to the first to eighth data (D1 to D8) without intervention of the processor 114.

It is assumed that each of the first to eighth data (D1 to D8) is read data or unit data for a read operation. Each of the first to eighth data (D1 to D8) may be sub data included in the read data. Each of the first to eighth data (D1 to D8) may have a specific data size such as 256B, 512B, 1 KB, 2 KB, 4 KB, etc. but the scope of the inventive concept is not limited thereto.

It is also assumed that after writing each of the first to eighth data (D1 to D8) in the buffer memory device 120, the FDMA engine 111 writes each of first through eighth meta data (M1 to M8) in the buffer memory device 120. After writing the first data D1 in the buffer memory device 120, the FDMA engine 111 may write the first meta data M1 corresponding to the first data D1 in the buffer memory device 120. After writing the second data D2 in the buffer memory device 120, the FDMA engine 111 may write the second meta data M2 corresponding to the second data D2 in the buffer memory device 120. After writing each of the third to eighth data (D3 to D8) in the buffer memory device 120, the FDMA engine 111 may write each of the third to eighth meta data (M3 to M8) corresponding to each of the third through eighth data (D3 to D8) in the buffer memory device 120.

It is assumed that the HDMA engine 112 performs the HDMA operation based on two data units or four data units depending on a driving method. For example, the HDMA engine 112 may perform the HDMA operation with respect to the first and second data (D1, D2) after the first and second data (D1, D2) is written in the buffer memory device 120 and may perform the HDMA operation with respect to the third and fourth data (D3, D4) after the third and fourth data (D3, D4) is written in the buffer memory device 120. The HDMA engine 112 may also perform the HDMA operation with respect to the fifth to eighth data (D5 to D8) after the fifth to eighth data (D5 to D8) is written in the buffer memory device 120.

The configurations described above are merely examples for describing the embodiments of the inventive concept briefly and clearly and the scope of the inventive concept is not limited thereto.

Referring to FIGS. 1 and 6, the timing diagram illustrated in FIG. 6 shows a DMA operation based on a polling operation. The HDMA engine 112 performs a polling operation with respect to a specific area of the buffer memory device 120 to check whether data is written in the buffer memory device 120 by the FDMA engine 111. A specific area of the buffer memory device 120 indicates a buffer area allocated for a read operation or an area in which meta data is to be stored. The polling operation indicates an operation of periodically checking the specific area of the buffer memory device.

As illustrated in FIG. 6, the HDMA engine 112 periodically performs the polling operation at each of first to eighth polling time points (pt1 to pt8). For example, the HDMA engine 112 may perform the polling operation with respect to the buffer memory device 120 at the first polling time point (pt1) and at the second polling time point (pt2) which is after a predetermined time has elapsed from the first polling time point. Similarly, the HDMA engine 112 may perform the polling operation at the third to eighth polling time points (pt3 to pt8) respectively.

As illustrated in FIG. 6, at the first polling time point (pt1), the HDMA engine 112 may check first and second meta data (M1, M2) through the polling operation. In this case, the HDMA engine 112 may perform the HDMA operation with respect to the first and second data (D1+D2). The HDMA operation indicates an operation of reading the first and second data (D1+D2) from the buffer memory device 120 and transmitting the first and second data (D1+D2) to the host 11.

After that, the HDMA engine 112 may perform the polling operation at the second polling time point (pt2). Since the polling operation at the second polling time point is performed before the fourth meta data M4 is written in the buffer memory device 120, the HDMA engine 112 may not perform the HDMA operation with respect to the third and fourth data (D3+D4). At the third polling time point (pt3), the HDMA engine 112 may check whether the third and fourth meta data (M3, M4) is written in the buffer memory device 120. If the third and fourth meta data (M3, M4) checked to be written in the buffer memory device 120, the HDMA engine 112 may perform the HDMA operation with respect to the third and fourth data (D3+D4).

As illustrated in FIG. 6, the fourth meta data M4 may be written in the buffer memory device 120 before the third polling time point (pt3). Even though the third and fourth data (D3, D4) is completely written into the buffer memory device 120, because of a polling period of the HDMA engine 112, the HDMA operation may begin after a first delay time (dT1) has elapsed from the completing the write operation of the fourth data D4 and the fourth meta data M4.

Similarly, when the HDMA operation is performed with respect to four unit data, the HDMA engine 112 may perform the polling operation at each of the fifth to seventh polling time points (pt5 to pt7). Since it is before the four unit data (i.e., the fifth to eighth data (D5 to D8)) is written in the buffer memory device 120, the HDMA engine 112 may not perform the HDMA operation. After that, the HDMA engine 112 may perform the polling operation at the eighth polling time point (pt8) to check that the fifth through eighth meta data (M5 to M8) are written in the buffer memory device 120 and thereby may perform the HDMA operation with respect to the fifth to eighth data (D5 to D8). Even though the fifth to eighth data (D5 to D8) is written in the buffer memory device 120 before the eighth polling time point (pt8), because of a polling period of the HDMA engine 112, the HDMA operation may begin after a second delay time (dT2) has elapsed from the time when the eighth data D8 and the eighth meta data M8 is all written.

As described above, the first and second delay times (dT1, dT2) that occur due to the polling period of the HDMA engine 112 may become read latency of the storage device 100 and this may degrades performance of the storage device 100.

Referring to FIGS. 1, 2 and 7, unlike the embodiment of FIG. 6, the HDMA engine 112 of the memory controller 110 may not perform the polling operation. Instead, the HDMA engine 112 may perform the HDMA operation in response to notification information (NT) of the HDMA engine 112.

The FDMA engine 111 may write first and second data (D1, D2) and first and second meta data (M1, M2) in the buffer memory device 120. As described above, the FDMA engine 111 may perform the write operation through the system bus 119. The snooper 113 may snoop around the system bus 119 to detect that the first and second meta data (M1, M2) is written in the buffer memory device 120. That is, the snooper 113 may provide the notification information (NT) to the HDMA engine 112 at a first snooping time point (st1).

The first snooping time point (st1) may be the time when the FDMA engine 111 provides signals (e.g., an address, a control signal, etc.) for writing the second meta data M2 to the buffer memory device 120 through the system bus 119. The first snooping time point (st1) may also be the time when the FDMA engine 111 provides information (i.e., valid bit) about the second meta data M2 to the buffer memory device 120 through the system bus 119.

The HDMA engine 112 may receive the notification information (NT) from the snooper 113 and may begin or perform the HDMA operation with respect to the first and second data (D1+D2) in response to the received notification information (NT). The HDMA engine 112 may read the first and second data (D1+D2) from the buffer memory device 120 and may transmit the read first and second data (D1+D2) to the host 11.

After writing the first and second data (D1, D2) and the first and second meta data (M1, M2) in the buffer memory device 120, the FDMA engine 111 may continuously write third and fourth data (D3, D4) and third and fourth meta data (M3, M4) in the buffer memory device 120. The snooper 113 may snoop around the system bus 119 to detect that the third and fourth meta data (M3, M4) is written in the buffer memory device 120. The snooper 113 may provide the notification information (NT) to the HDMA engine 112 at a second snooping time point (st2).

The second snooping time point (st2) may be the time when the FDMA engine 111 provides signals (e.g., an address, a control signal, etc.) for writing the fourth meta data M4 to the buffer memory device 120 through the system bus 119. The second snooping time point (st2) may also be the time when the FDMA engine 111 provides information (i.e., valid bit) about the fourth meta data M4 to the buffer memory device 120 through the system bus 119.

Similarly, in a DMA operation with respect to four unit data, the FDMA engine 111 may write fifth to eighth data (D5 to D8) and fifth to eighth meta data (M5 to M8) in the buffer memory device 120. The snooper 113 may snoop around the system bus 119 to detect that the eighth meta data M8 is written in the buffer memory device 120. The snooper 113 may provide the notification information (NT) to the HDMA engine 112 at a third snooping time point (st3) and the HDMA engine 112 may perform the HDMA operation with respect to the fifth to eighth data (D5 to D8) in response to the notification information (NT).

Unlike the embodiment of FIG. 6, in the embodiment of FIG. 7, even though the HDMA engine 112 does not perform a periodic polling operation, since the snooper 113 can detect a write time of meta data through the snooping operation, the HDMA operation by the HDMA engine 112 may be performed in parallel with writing of the meta data or upon detecting the completion of writing meta data by the snooper 113. According to the embodiment of FIG. 7, the first and second delay times (dT1, dT2) described with reference to FIG. 6 may be prevented. Because of this, the whole DMA operation time (T_DMA2) according to the embodiment of FIG. 7 may be shorter than the whole DMA operation time (T_DMA1) illustrated in FIG. 6. Due to a removal of the delay time, read latency of the storage device 100 may be reduced and overall performance of the storage device may be improved.

The snooper 113 may snoop around the system bus or a buffer channel to detect a write of meta data and the HDMA engine 112 may perform the HDMA operation in response to the detection of the snooper 113 or the notification information (NT) from the snooper 113. Since the HDMA engine 112 can begin the HDMA operation without the polling operation, a time delay due to a polling period may be prevented.

Since the periodic polling operation performs a repetitive access with respect to a specific area of the buffer memory device, reliability of data stored in the buffer memory device may be reduced. However, since the HDMA engine 112 does not perform the polling operation, an access to the buffer memory device due to the periodic polling operation may be reduced and thus reliability degradation of data stored in the buffer memory device may be prevented.

Figure 8:
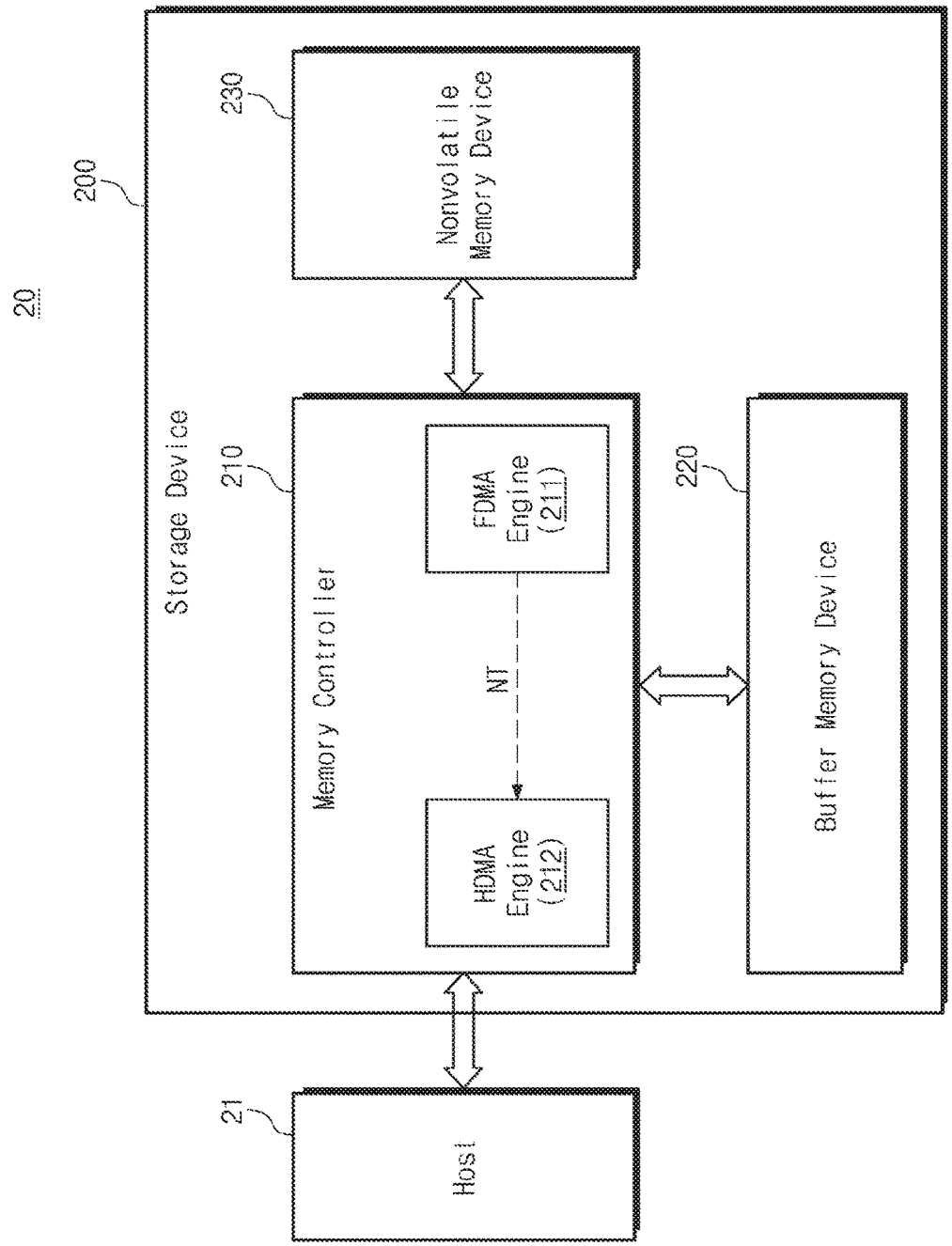
FIG. 8 is a block diagram illustrating a computing system according to example embodiments of the inventive concept.

FIG. 8 is a block diagram illustrating a computing system 20 according to example embodiments of the inventive concept. Referring to FIG. 8, a computing system 20 may include a host 21 and a storage device 200. The storage device 200 may include a memory controller 210, a buffer memory device 220, and a nonvolatile memory device 230.

The memory controller 210 may include a FDMA engine 211 and a HDMA engine 212.

Unlike the memory controller 110 shown in FIG. 1, the memory controller 210 of FIG. 8 may not include the snooper 113 illustrated in FIG. 1. Instead, the FDMA engine 211 may provide notification information (NT) to the HDMA engine 212. The HDMA engine 212 may perform a HDMA operation in response to the notification information (NT) from the FDMA engine 211.

The FDMA engine 211 may be configured to control FDMA operation of writing read data from the nonvolatile memory device 230 in the buffer memory device 220. The FDMA engine 211 may write the read data and meta data corresponding to the read data in the buffer memory device 220. The FDMA engine 211 may provide the notification information (NT) to the HDMA engine 212 after writing the meta data in the buffer memory device 220 or while writing the meta data in the buffer memory device 220.

The notification information (NT) from the FDMA engine 211 is information notifying that all the read data or read data of a specific unit is written in the buffer memory device 220. The HDMA engine 212 may perform the HDMA operation in response to the notification information (NT).

The memory controller 110 described with reference to FIGS. 1 through 7, may include the snooper 113 to perform a snoop operation in which a write of the meta data is detected by thea snooping operation. The FDMA engine 211 may provide information (i.e., the notification information (NT)) about whether the meta data is written to the HDMA engine 212. Thus, the HDMA engine 212 may begin or perform the HDMA operation in response to the notification information (NT) from the FDMA engine 211 without performing a periodic polling operation on the buffer memory device 220.

Figure 9:
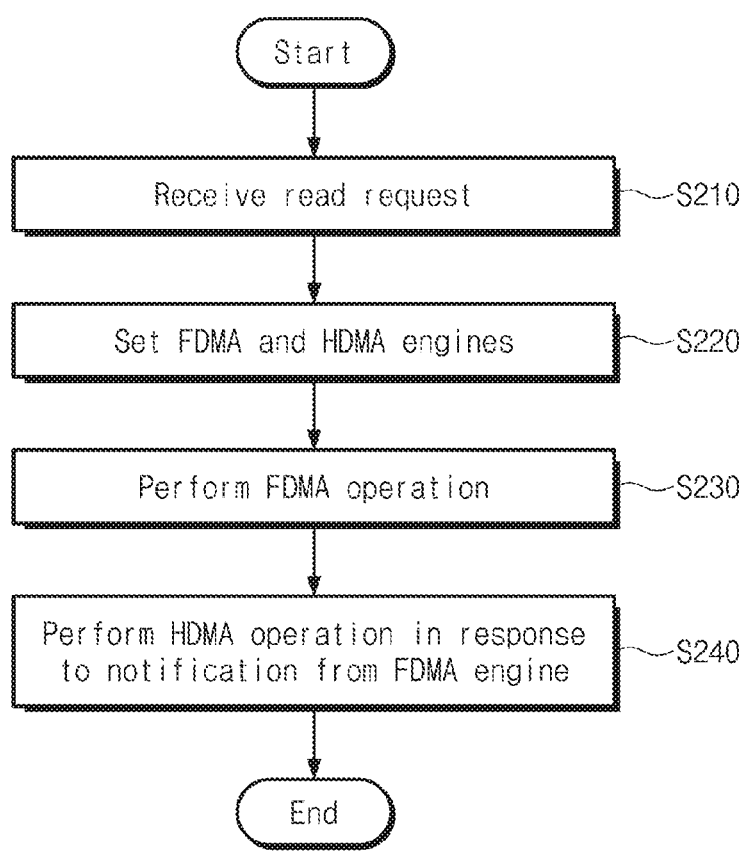
FIG. 9 is a flowchart illustrating an operation of a memory controller of FIG. 8.

FIG. 9 is a flowchart illustrating an operation of a memory controller 210 of FIG. 8. Referring to FIGS. 8 and 9, the memory controller 210 may perform operations S210 through S230. The operations S210 through S230 may be like the operations S110 through S130 of FIG. 3.

In an operation S240, the memory controller 210 may perform the HDMA operation in response to the notification information (NT) from the FDMA engine 211. The FDMA engine 211 may perform the FDMA operation to write read data and meta data in the buffer memory device 220. The FDMA engine 211 may provide the notification information (NT) to the HDMA engine 212 after or while writing the meta data in the buffer memory device 220.

The HDMA engine 212 of the memory controller 210 may perform the HDMA operation in response to the notification information (NT) from the FDMA engine 211.

Figure 10:
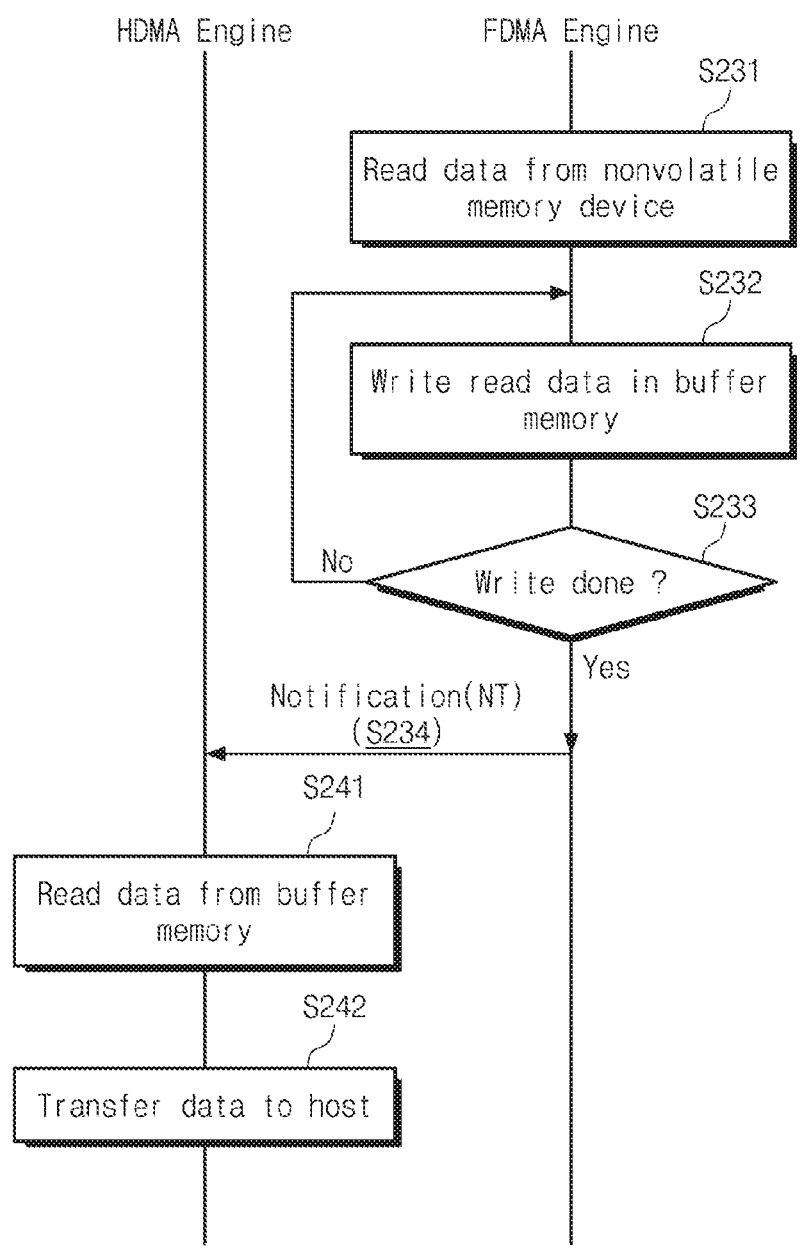
FIG. 10 is a flowchart illustrating an operation of FIG. 9 in detail.

FIG. 10 is a flowchart illustrating an operation of FIG. 9 in detail. Referring to FIGS. 8 through 10, the FDMA engine 211 may perform operations of S231 and S232. The operations of S231 and S232 may be like the operations of S131 and S132 of FIG. 4.

In an operation S233, the FDMA 211 may determine whether a write operation is completed. For example, the FDMA engine 211 may determine whether read data of a specific unit is written in the buffer memory device 220. The FDMA engine 211 may also determine whether a specific number of meta data is written in the buffer memory device 220. If the write operation is not completed, the FDMA engine 211 may perform the operation of S232. The FDMA engine 211 may further read data from the nonvolatile memory device 230 during the operation S232, the FDMA engine 211 may write the read data in the buffer memory device 220.

In the case where the write operation is completed (i.e., read data of a specific unit is written in the buffer memory device 220 or a specific number of meta data is written in the buffer memory device 220), in an operation S234, the FDMA engine 211 may provide the notification information (NT) to the HDMA engine 212. The notification information (NT) may be information notifying that the read data is successfully written in the buffer memory device 220.

The operations of S231 through S234 may be included in the FDMA operation of S230 of FIG. 9.

The HDMA engine 212 may perform operations of S241 and S242 in response to the notification information (NT) from the FDMA engine 211. Since the operations of S241 and S242 are similar to the operations of S151 and S152 of FIG. 4, a detailed description thereof is omitted. The operations of S241 and S242 may be included in the HDMA operation of S240 of FIG. 9.

Figure 11:
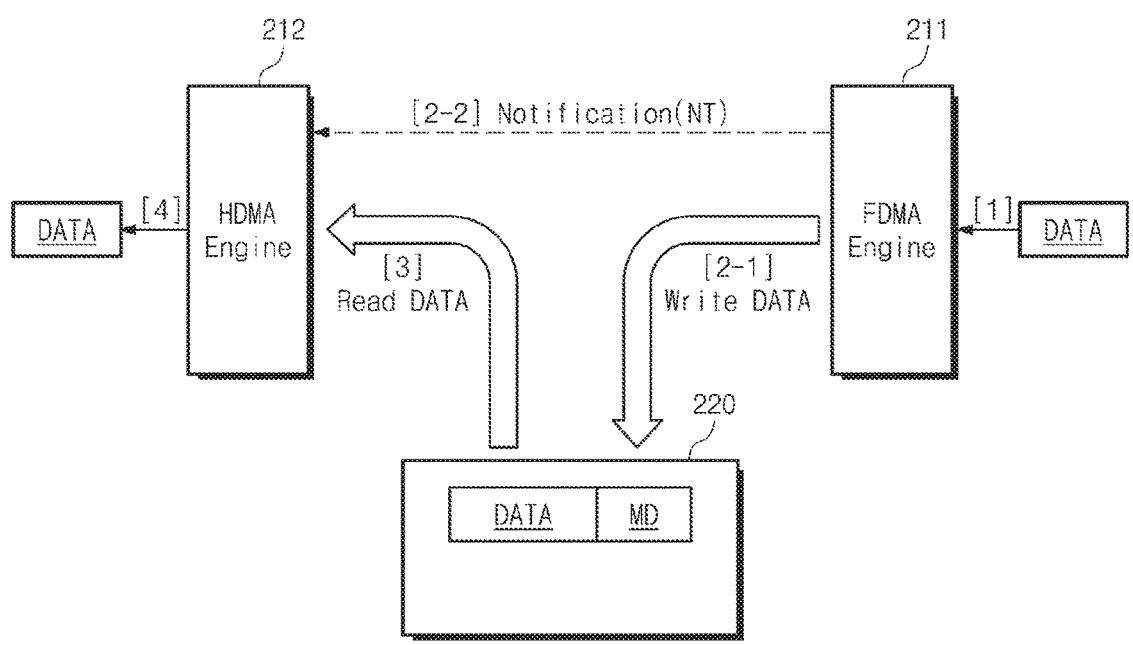
FIG. 11 is a conceptual diagram illustrating an operation according to the flowchart of FIG. 10 in detail.

FIG. 11 is a conceptual diagram illustrating an operation according to the flowchart of FIG. 10 in detail.

Referring to FIG. 11, the FDMA engine 211 may read data DATA from the nonvolatile memory device 230 and may write the read data DATA in the buffer memory device 220 (operations [1] and [2-1]).

As illustrated in FIG. 5, the FDMA engine 211 may write meta data MD with respect to the data DATA in the buffer memory device 220 after writing the data DATA in the buffer memory device 220. The FDMA engine 211 may provide the notification information (NT) to the HDMA engine 212 after or while writing the meta data MD in the buffer memory device 220 (operation [2-2]).

The HDMA engine 212 may read the data DATA from the buffer memory device 220 and provide the read data DATA to the host 21 (operations[3] and [4]).

Although the embodiment with respect to a single read data unit is illustrated in FIG. 11, the scope of the inventive concept is not limited thereto and the embodiment of the inventive concept may be applied to a plurality of unit data. For example, the FDMA engine 211 may write a plurality of read data and a plurality of meta data corresponding to the plurality of read data respectively in the buffer memory device 220. The FDMA engine 211 may provide the notification information (NT) to the HDMA engine 212 whenever each of the plurality of meta data is written in the buffer memory device 220. The FDMA engine 211 may also provide the notification information (NT) to the HDMA engine 212 whenever a specific number of meta data is written in the buffer memory device 220. The HDMA engine 212 may perform a HDMA operation with respect to corresponding data in response to the notification information (NT). The FDMA operation and the HDMA operation may be performed in parallel.

The HDMA engine 212 may begin or perform the HDMA operation without a delay time by providing, by the FDMA engine 211, the notification information (NT) to the HDMA engine 212 whenever a specific number of meta data is written in the buffer memory device 220.

Figure 12:
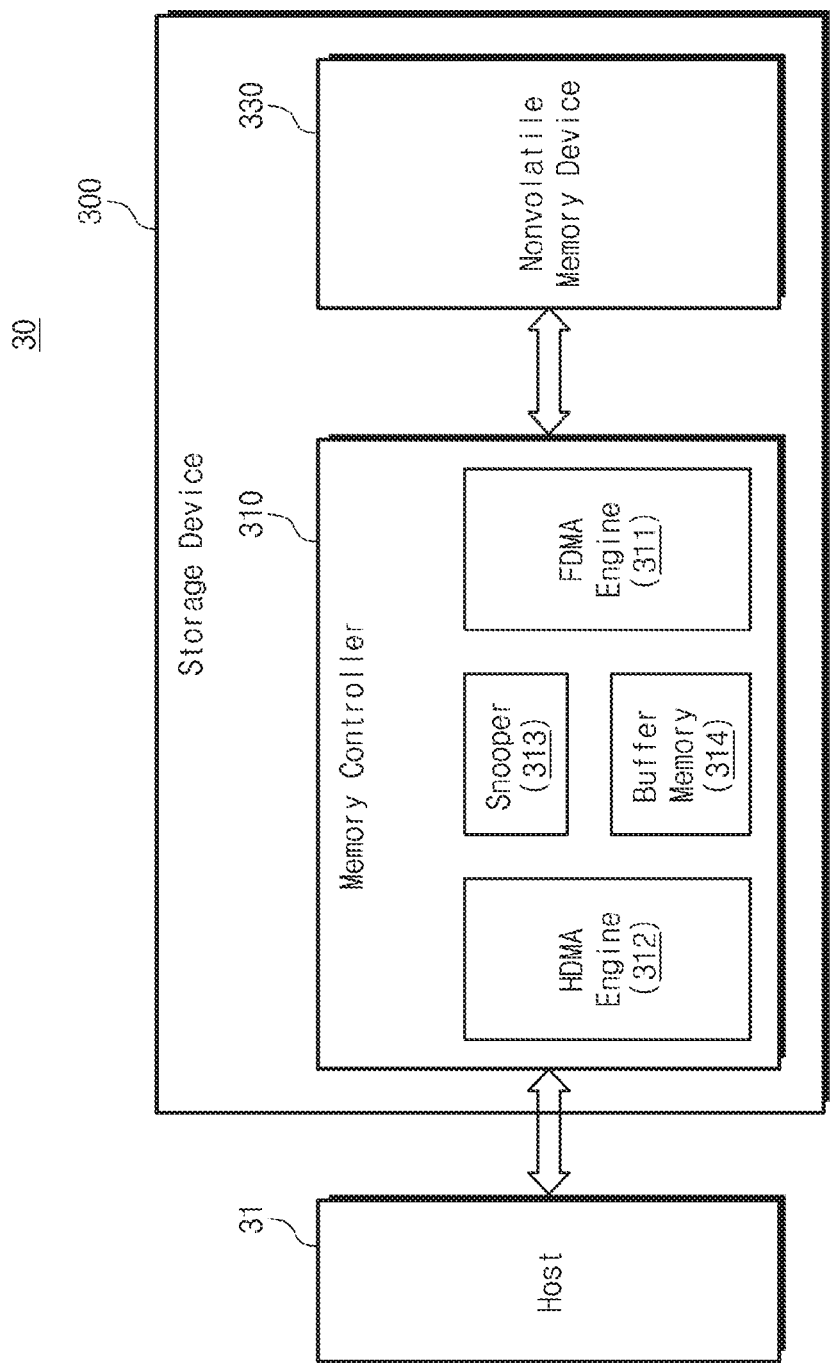
FIG. 12 is a block diagram illustrating a computing system according to example embodiments of the inventive concept.

FIG. 12 is a block diagram illustrating a computing system according to example embodiments of the inventive concept. Referring to FIG. 12, a computing system 30 may include a host 31 and a storage device 300. The storage device 300 may include a memory controller 310 and a nonvolatile memory device 330. The memory controller 310 may include a FDMA engine 311, a HDMA engine 312, a snooper 313, and a buffer memory 314. For convenience of description, a description of configuration elements similar to the configuration elements described above is omitted.

Unlike the memory controller 110 of FIG. 1, the memory controller 310 of FIG. 12 may include the buffer memory 314. The buffer memory 314 may perform a function similar to the buffer memory devices (120, 220) described with reference to FIGS. 1 through 11. The buffer memory 314 may be configured to temporarily store write data received from the host 31, read data read from the nonvolatile memory device 330, or various information required when the memory controller 310 operates. The buffer memory 314 may be a high speed random access memory such as a SRAM (static RAM), a DRAM (dynamic RAM), a SDRAM (synchronous DRAM), etc.

The buffer memory 314 may be configured to be connected to a system bus (refer to FIG. 2) included in the memory controller 310. The FDMA engine 311 may perform a FDMA operation through the system bus. The snooper 313 may snoop around the system bus to detect whether read data or meta data is written in the buffer memory 314 and may provide notification information to the HDMA engine 312 according to a detection result. The HDMA engine 312 may perform a HDMA operation with respect to data stored in the buffer memory 314.

The snooper 313 of the memory controller 310 may snoop around the system bus to detect whether the read data is written in the buffer memory 314 and may provide the notification information that indicates the detection result to the HDMA engine 312. Since the HDMA engine 312 may begin or perform the HDMA operation without a polling operation with respect to the buffer memory 314 in response to the notification information, a delay due to the polling operation may be prevented. Thus, a storage device having improved performance is provided.

The embodiments of the inventive concept described above were described based on a read operation of the storage device but the scope of the inventive concept is not limited thereto. In a write operation of the storage device according to a write request of the host, the HDMA engine may write data from the host in the buffer memory device. In this case, the snooper may snoop around the system bus to detect whether write data is written and may provide notification information indicating a detection result to the FDMA engine. In response to the notification information, the FDMA engine may read write data from the buffer memory device and may transmit the read data to the nonvolatile memory device. Because the FDMA operation by the FDMA engine may become faster through the snooping operation of the snooper, a write speed with respect to a specific write request of the host may be improved.

Figure 13:
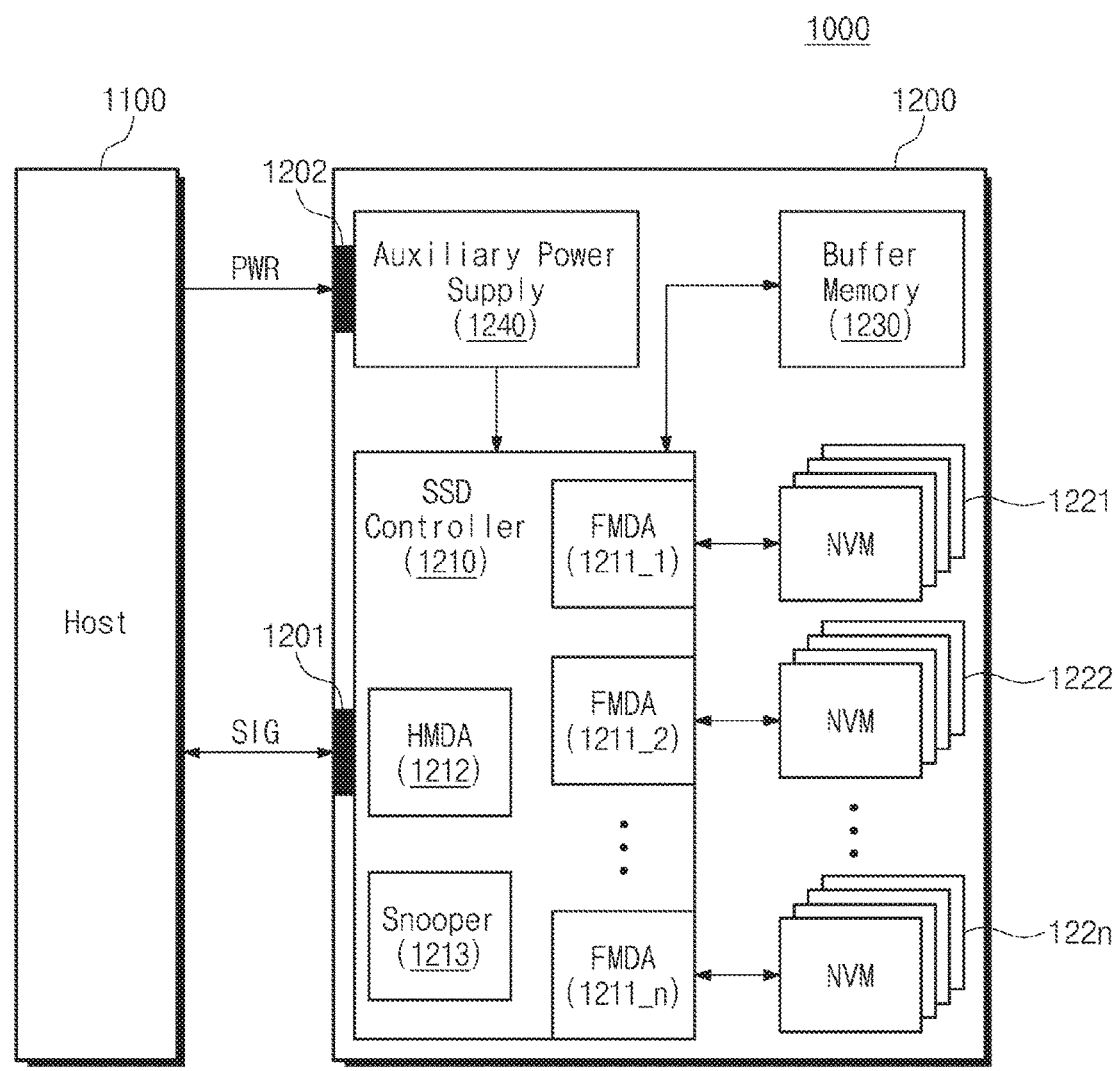
FIG. 13 is a block diagram illustrating a SSD (solid state drive) system including a storage device according to example embodiments of the inventive concept.

FIG. 13 is a block diagram illustrating a SSD (solid state drive) system including a storage device according to example embodiments of the inventive concept. Referring to FIG. 13, a SSD system 1000 includes a host 1100 and a SSD 1200.

The SSD 1200 exchanges a signal SIG with the host 1100 through a signal connector 1201 and receives power PWR through a power supply connector 1202. The signal SIG may be a signal indicating write data, read data, a request, various control information, etc. The SSD 1200 may include a SSD controller 4210, a plurality of flash memories (1221 to 122n), a buffer memory 1230, and an auxiliary power supply device 1240.

The SSD controller 1210 may control the flash memories (1221 to 122n) in response to the signal SIG received from the host 1100. The flash memories (1221 to 122n) may operate under the control of the SSD controller 1210. The SSD controller 1210 may be the memory controller (110, 120, 130) described with reference to FIGS. 1 through 12.

The SSD controller 1210 may include FDMA engines (1211_1 to 1211_$n$), a HDMA engine 1212, or a snooper 1213 such as described with reference to FIGS. 1 through 12. The FDMA engines (1211_1 to 1211_$n$) may correspond to a plurality of channels connected to the plurality of flash memories (1221 to 122$n$) respectively. The snooper 1213 may be configured to detect that read data is written in the buffer memory 1230 by one of the FDMA engines (1211_1 to 1211_$n$) by snooping around the system bus inside the controller 1210 and thereby to provide notification information (NT) to the HDMA engine 1212. The HDMA engine 1212 may perform a corresponding HDMA operation with respect to the read data in response to the notification information. The embodiments of the inventive concept described above may be applied to the SSD system 1000 including a multi-channel.

The buffer memory 1230 operates as a buffer memory of the SSD 1200. For example, the buffer memory 1230 may temporarily store data received from the host 1100 or data received from the flash memories (1221 to 122$n$) or may temporarily store meta data (e.g., mapping table) of the flash memories (1221 to 122$n$). The buffer memory 1240 may temporarily store various information required when the SSD controller 1210 operates.

The auxiliary power supply device 1230 is connected to the host 1100 through a power supply connector 1002. The auxiliary power supply device 1230 may receive power PWR from the host 1100 to charge the auxiliary power supply device 1230. When there is not enough power supply from the host 1100, the auxiliary power supply 1230 may provide a power supply of the SSD 1200.

According to the inventive concept, in a direct memory access (DMA) operation of a storage device, it may be detected whether read data is written in a buffer memory device by a flash direct memory access (FDMA) operation through a snooping operation of a snooper included in a memory controller and for doing that, a host direct memory access (HDMA) operation may begin. Thus, since the HDMA operation may begin without a separate polling operation with respect to the buffer memory device, a time delay by the polling operation may be prevented. Thus, a memory controller having improved performance and a storage device including the same are provided.

The contents described above are specific embodiments for implementing the inventive concept. The inventive concept may include not only the embodiments described above but also embodiments in which a design is simply or easily capable of being changed. The inventive concept may also include technologies easily changed to be implemented using embodiments. Thus, the scope of the inventive concept is to be determined by the following claims and their equivalents, and shall not be restricted or limited by the foregoing embodiments.

What is claimed is:

1. A memory controller comprising:
a system bus;
a first direct memory access (DMA) engine configured to receive a first data through the system bus and to write the first data in a buffer memory through the system bus;
a snooper configured to monitor the system bus to detect a completion of writing the first data into the buffer memory and to output notification information based on a detecting result on condition of detecting the completion; and
a second direct memory access (DMA) engine configured to transmit the first data written in the buffer memory to a host in response to the notification information from the snooper.

2. The memory controller of claim 1, wherein the first DMA is further configured to write a first meta data corresponding to the first data into the buffer memory after writing the first data into the buffer memory.

3. The memory controller of claim 1, wherein the first data comprises a plurality of sub data, and the first DMA engine is configured to write a plurality of meta data, each of the plurality of meta data corresponds to each of the plurality of sub data in the buffer memory.

4. The memory controller of claim 1, wherein the second DMA engine is configured to transmit the first data written in the buffer memory to the host in response to the notification information.

5. The memory controller of claim 1, further comprising:
a first interface configured to communicate with a nonvolatile memory device and to receive the first data from the nonvolatile memory device, and
a second interface configured to communicate with the host and to transmit the first data to the host,
wherein the first DMA engine is configured to write the first data received through the first interface in the buffer memory, and
wherein the second DMA engine is configured to transmit the first data to the host through the second interface.

6. The memory controller of claim 1, further comprising:
a processor performing an initial setting with respect to the first DMA engine and the second DMA engine in response to a request from the host.

7. The memory controller of claim 1, further comprising:
a buffer controller configured to be connected to the system bus and to control the buffer memory according to a control of the first DMA engine and the second DMA engine.

8. The memory controller of claim 2, wherein the snooper is configured to detect completion of writing the first data into the buffer memory by detecting the first meta data being transmitted to the buffer memory through the system bus.

9. The memory controller of claim 3, wherein the snooper is configured to detect the completion of writing the first data into the buffer memory on condition of detecting a specific number of meta data being written in the buffer memory.

10. The memory controller of claim 6, wherein the first DMA engine is configured to write the first data in the buffer memory without intervention of the processor after being initially set by the processor, and
wherein the second DMA engine is configured to transmit the first data from the buffer memory to the host without intervention of the processor after being initially set by the processor.

11. The memory controller of claim 9, wherein the second DMA engine is configured to transmit a first sub data among the plurality of sub data to the host in response to the notification information, the first sub data corresponding to a first meta data among the plurality of meta data written in the buffer memory.

12. A storage device, comprising:
a nonvolatile memory device;
a memory controller configured to transmit a first data stored in the nonvolatile memory device to a host according to a request of the host; and
a buffer memory device configured to temporarily store the first data according to a control of the memory controller, wherein the memory controller includes,
a system bus,
a first direct memory access (DMA) engine configured to write the first data from the nonvolatile memory device in the buffer memory device, the first data being transmitted to the buffer memory device through the system bus,
a snooper configured to monitor the system bus to detect a completion of writing the first data into the buffer memory device and to output notification information indicating that the first data is stored in the buffer memory device on condition of detecting the completion, and
a second direct memory access (DMA) engine configured to transmit the first data written in the buffer memory device to the host in response to the notification information from the snooper.

13. The storage device of claim 12, wherein the memory controller further includes a processor configured to initially set the first and second DMA engines according to the request of the host.

14. The storage device of claim 12, wherein the second DMA engine is configured to transmit the first data written in the buffer memory device to the host without performing a periodic polling operation on the buffer memory device in response to the notification information.

15. The storage device of claim 13, wherein the first DMA engine is configured to write the first data in the buffer memory device without intervention of the processor after being initially set by the processor, and wherein the second DMA engine is configured to transmit the first data from the buffer memory device to the host without intervention of the processor after being initially set by the processor.

16. A method of operating a storage device, the method comprising:
receiving a first data from a nonvolatile memory device through a system bus;
writing the first data into a buffer memory by a first direct memory access (a first DMA);
causing a snooper to monitor the system bus to detect a completion of writing the first data into the buffer memory and to output notification information on condition of detecting the completion; and
transmitting the first data stored in the buffer memory to a host by a second direct memory access (a second DMA) in response to the notification information.

17. The method of claim 16, wherein the notification information is outputted immediately after completing the writing the first data into the buffer memory.

18. The method of claim 17, wherein transmitting the first data to the host is performed by the second DMA without delay from receiving the notification information.

19. The method of claim 18, wherein transmitting the first data to the host is performed without periodical polling operation by the second DMA.

20. The method of claim 19, wherein the method further includes writing a first meta data corresponding to the first data after writing the first data into the buffer memory and transmitting the first meta data to the host after transmitting the first data to the host.

* * * * *